(12) United States Patent
Komulainen et al.

(10) Patent No.: US 12,341,251 B2
(45) Date of Patent: Jun. 24, 2025

(54) ANTENNA APPARATUS

(71) Applicant: NOKIA TECHNOLOGIES OY, Espoo (FI)

(72) Inventors: Mikko Komulainen, Oulu (FI); Juha Samuel Hallivuori, Tampere (FI); Willem Verbiest, Sint-Gillis-Waas (BE); Ronny Peeters, Hoboken (BE); Natalia Dementieva, Antwerp (BE); Nikolaus Singer, Gablitz (AT); Nikolas Olaziregi, Antwerp (BE)

(73) Assignee: NOKIA TECHNOLOGIES OY, Espoo (FI)

( * ) Notice: Subject to any disclaimer, the term of this patent is extended or adjusted under 35 U.S.C. 154(b) by 276 days.

(21) Appl. No.: 18/055,892

(22) Filed: Nov. 16, 2022

(65) Prior Publication Data
US 2023/0155298 A1    May 18, 2023

(30) Foreign Application Priority Data

Nov. 17, 2021  (EP) ..................... 21208707

(51) Int. Cl.
*H01Q 1/22* (2006.01)
*H01Q 1/52* (2006.01)
(Continued)

(52) U.S. Cl.
CPC .............. *H01Q 21/062* (2013.01); *H01Q 1/22* (2013.01); *H01Q 1/525* (2013.01); *H04L 5/14* (2013.01)

(58) Field of Classification Search
CPC ........ H01Q 21/062; H01Q 1/22; H01Q 1/525; H04L 5/14
See application file for complete search history.

(56) References Cited

U.S. PATENT DOCUMENTS 10,673,135 B2   6/2020   Yu et al.
10,700,441 B2   6/2020   Watson
(Continued)

FOREIGN PATENT DOCUMENTS

WO    WO 2019/133195 A1    7/2019

OTHER PUBLICATIONS

Bang et al., "A Compact Hemispherical Beam-Coverage Phased Array Antenna Unit for 5G mm-Wave Applications", IEEE Access, vol. 8, (Jul. 30, 2020), 12 pages.
(Continued)

*Primary Examiner* — Henry Luong
(74) *Attorney, Agent, or Firm* — ALSTON & BIRD LLP

(57) ABSTRACT

An apparatus includes an antenna array having a plurality of antenna elements. The antenna array includes one or more grouping of the plurality of antenna elements, configured to provide: a first configuration in which the one or more grouping of antenna elements supports at least transmission of a signal according to a first antenna system; and a second configuration in which the one or more grouping of antenna elements supports at least reception of a signal according to a second antenna system. The first antenna system includes a Single Input, Single Output antenna system or Multiple Input, Multiple Output antenna system. The second antenna system includes a Single Input, Single Output antenna system or Multiple Input, Multiple Output antenna system. An array of antenna elements can support different modes of operation, for example, different Multiple Input, Multiple Output modes or Multiple Input, Multiple Output and Single Input, Single Output modes.

20 Claims, 10 Drawing Sheets

(51) Int. Cl.
    *H01Q 21/06*         (2006.01)
    *H04L 5/14*          (2006.01)

(56) References Cited

U.S. PATENT DOCUMENTS

| | | |
|---|---|---|
| 10,958,316 B2 | 3/2021 | Bisiules et al. |
| 2008/0273579 A1* | 11/2008 | Rofougaran ......... H01Q 21/062 |
| | | 375/E7.002 |
| 2013/0301454 A1 | 11/2013 | Seol et al. |
| 2014/0044207 A1 | 2/2014 | Han |
| 2015/0282122 A1 | 10/2015 | Kim |
| 2020/0275457 A1 | 8/2020 | Hmimy |

OTHER PUBLICATIONS

Extended European Search Report for Application No. 21208707.6 dated Mar. 1, 2022, 8 pages.
Parchin et al., "Eight-Element Dual-Polarized MIMO Slot Antenna System for 5G Smartphone Applications", IEEE Access, vol. 7, (Jan. 31, 2019), 10 pages.
Taghikhani et al., "Hybrid Beamforming Transmitter Modeling for Millimeter-Wave MIMO Applications", IEE Transactions on Microwave Theory and Techniques, vol. 68, Issue 11, (Jun. 2, 2020), 13 pages.

\* cited by examiner

| Switch | State for during TX TDD slot | State for during RX TDD slot |
|---|---|---|
| 1 | Right | Left |
| 2 | Left | Right |
| 3 | Right | Left |

ANTENNA APPARATUS

CROSS-REFERENCE TO RELATED APPLICATIONS

This application claims priority to European Patent Application No. 21208707.6 filed Nov. 17, 2021, the entire contents of which are incorporated herein by reference.

TECHNOLOGICAL FIELD

Various example embodiments relate to a configurable antenna apparatus.

BACKGROUND

Wireless communication systems are known. Typically, users of such networks require access to high quality services at any time and location and create substantial network traffic. Wireless communication networks are adapting to provide sufficient capacity and satisfactory data rates. Various adaptations are being made to wireless communication systems to support changes in network usage.

One possible adaptation comprises providing internet access to a location using wireless mobile network technology rather than fixed lines. This adaptation is typically known as a fixed wireless access (FWA) approach. FWA offerings can enable establishment of cost-effective broadband services, even in locations which do not have access to fixed line broadband. Typically, FWA maybe require minimal engineering work at a user location. Furthermore, a standard FWA deployment may require self-installation of user or customer premise equipment (CPE).

Providing a deployment which can accommodate adaptations and the requirements of various modes of operation can present various challenges. It is desired to address some of those challenges.

BRIEF SUMMARY

The scope of protection sought for various embodiments of the invention is set out by the independent claims. The embodiments and features, if any, described in this specification that do not fall under the scope of the independent claims are to be interpreted as examples useful for understanding various embodiments of the invention.

According to various, but not necessarily all, embodiments of the invention there is provided an apparatus, comprising: an antenna array comprising a plurality of antenna elements, the antenna array comprising one or more grouping of the plurality of antenna elements configured to provide: a first configuration in which the one or more grouping of the plurality of antenna elements supports at least transmission of a signal according to a first antenna system; and a second configuration in which the one or more grouping of the plurality of antenna elements supports at least reception of a signal according to a second antenna system, and wherein the first antenna system comprises one of: a Single Input, Single Output antenna system or Multiple Input, Multiple Output antenna system; and wherein the second antenna system comprises one of: a Single Input, Single Output antenna system or Multiple Input, Multiple Output antenna system.

According to various, but not necessarily all, embodiments the antenna elements may comprise one or more cross-polarised antenna elements.

According to various, but not necessarily all, embodiments the apparatus is configured in the first configuration in which the one or more grouping of the plurality of antenna elements supports transmission and reception of a signal and in the second configuration in which the one or more grouping of the plurality of antenna elements supports transmission and reception of a signal.

According to various, but not necessarily all, embodiments, at least one of the first and second antenna systems support communication using a Multiple Input, Multiple Output antenna technology, and are configured to implement a mode of operation using Frequency Division Duplex techniques.

According to various, but not necessarily all, embodiments, the apparatus is configured to operate in a wireless communication network operating using frequency division duplex techniques, wherein the first configuration is configured to transmit a signal from a first grouping of the plurality of antenna elements and simultaneously receive a signal from the first grouping of the plurality of antenna elements, and the second configuration is configured to transmit a signal from a second grouping, different to the first grouping, of the plurality of antenna elements and simultaneously receive a signal from the second grouping of the plurality of antenna elements.

According to various, but not necessarily all, embodiments, at least one of the first and second antenna systems support communication using a multiple input, multiple output antenna technology, and are configured to implement a mode of operation using Time Division Duplex techniques.

According to various, but not necessarily all, embodiments, the first and second antenna systems are configured to support Multiple Input, Multiple Output antenna technologies which wherein the first configuration and second configuration utilise Time Division Duplex communication techniques.

According to various, but not necessarily all, embodiments, the first and second antenna systems are configured to support multiple input, multiple output antenna technologies which wherein the first configuration and second configuration utilise Frequency Division Duplex communication techniques.

According to various, but not necessarily all, embodiments the first configuration comprises substantially all of the plurality of antenna elements configured for use as a single array.

According to various, but not necessarily all, embodiments the first configuration comprises an array of all of the plurality of antenna elements.

According to various, but not necessarily all, embodiments the second configuration comprises at least two sub arrays formed from the one or more grouping of the plurality of antenna elements.

According to various, but not necessarily all, embodiments the first configuration and second configuration have coincident boresight directions.

According to various, but not necessarily all, embodiments the antenna gain from the first configuration differs from the antenna gain from the second configuration.

According to various, but not necessarily all, embodiments, one of the first and second configurations is configured to support single input, single output antenna technology within a wireless communication network.

According to various, but not necessarily all, embodiments the apparatus is configured to transmit a signal supporting a first communication link according to a first mode of Multiple Input, Multiple Output operation using the first configuration and to receive a signal supporting a second communication link according to a second mode of Multiple Input, Multiple Output operation using the second configuration.

According to various, but not necessarily all, embodiments the apparatus is configured to operate in a wireless communication network, wherein the first and second configurations are configured to support transmission within the wireless communication network using a first set of one or more frequencies; and the first and second configurations are configured to support reception within the wireless communication network using a second set of one or more frequencies.

According to various, but not necessarily all, embodiments, the first and second sets of frequencies differ.

According to various, but not necessarily all, embodiments, concurrent communication links within the wireless communication network can be supported using the first and second sets of one or more frequencies.

According to various, but not necessarily all, embodiments, the apparatus is configured to operate in a wireless communication network, wherein the first and second configurations are configured to support Frequency Division Duplex communication within the wireless communication network according to different Multiple Input, Multiple Output, antenna technologies in transmission and reception.

According to various, but not necessarily all, embodiments the apparatus is configured to operate in a wireless communication network operating using Frequency Division Duplex techniques, wherein the wherein the first configuration is configured to transmit radiation at the plurality of antenna elements according to a first Frequency Division Duplex frequency regime and the second configuration is configured to receive radiation at the plurality of antenna elements according to a second Frequency Division Duplex frequency regime.

According to various, but not necessarily all, embodiments the apparatus configured to operate in a wireless communication network, wherein the wherein the first configuration is configured for transmission of radiation from the plurality of antenna elements and the second configuration is configured for reception of radiation at the plurality of antenna elements and wherein the transmission and reception are performed consecutively.

According to various, but not necessarily all, embodiments the apparatus is configured to operate in a wireless communication network operating using Time Division Duplex techniques, wherein the wherein the first configuration is configured to transmit radiation from the plurality of antenna elements in a Time Division Duplex transmission timeslot and the second configuration is configured to receive radiation at the plurality of antenna elements in a Time Division Duplex reception timeslot.

According to various, but not necessarily all, embodiments the apparatus comprises at least one processor and at least one memory including computer program code for one or more programs, the at least one memory and the computer program code configured to, with the at least one processor, cause the apparatus at least to: receive an indication of timings of transmission and reception timeslots in support of a communication link within a wireless communication network and configure the plurality of antenna elements to operate in accordance with the first configuration in a transmission timeslot; and configure the plurality of antenna elements to operate in accordance with the second configuration in a reception timeslot.

According to various, but not necessarily all, embodiments the apparatus comprises circuitry, configured to detect an indication of timings of transmission and reception timeslots in support of a communication link within a wireless communication network and to control configuration of the plurality of antenna elements to operate in accordance with the first configuration in a transmission timeslot; and reconfigure the plurality of antenna elements to operate in accordance with the configuration in a reception timeslot, in dependence upon the detected indication of timings.

According to various, but not necessarily all, embodiments the apparatus comprises: radio frequency circuitry configured to couple a signal into and out of the plurality of antenna elements via one or more input and output ports; the radio frequency circuitry being reconfigurable between: a first arrangement in which a signal is couplable to one or more an input and output ports, wherein the input and output ports are coupled to the plurality of antenna elements to allow operation of the apparatus in the first configuration; and a second arrangement in which a signal is couplable to one or more further input and output ports, wherein the further input and output ports are coupled to the plurality of antenna elements to allow operation of the apparatus in the second configuration.

According to various, but not necessarily all, embodiments the antenna array elements are configured to operate in the sub-6 Ghz frequency range.

According to various, but not necessarily all, embodiments, there is provided an electronic device comprising an apparatus as described above. The electronic device may comprise a robot, drone or similar.

A further aspect provides a communication apparatus comprising the apparatus described above, wherein the communication apparatus is: a base station; a user equipment; fixed wireless access device equipment; a portable device; or a vehicle. The vehicle may comprise a car, lorry, train or similar.

A further aspect of the invention provides a method for configuring an antenna array comprising a plurality of antenna elements, the antenna array comprising one or more grouping of antenna elements, the method comprising: configuring the one or more grouping of the plurality of antenna elements to provide a first configuration which supports at least transmission of a signal according to a first antenna system; and configuring the one or more grouping of the plurality of antenna elements to provide a second configuration which supports at least transmission of a signal according to a second antenna system, wherein the first antenna system comprises one of: a Single Input, Single Output antenna system or Multiple Input, Multiple Output antenna system, and wherein the second antenna system comprises one of: a Single Input, Single Output antenna system or Multiple Input, Multiple Output antenna system.

According to various, but not necessarily all, embodiments the antenna elements comprise one or more cross-polarised antenna elements.

According to various, but not necessarily all, embodiments the method comprises According to various, but not necessarily all, embodiments the method comprises configuring the first antenna configuration such that the one or more grouping of the plurality of antenna elements supports transmission and reception of a signal and configuring the second antenna configuration such that the one or more grouping of the plurality of antenna elements supports transmission and reception of a signal.

According to various, but not necessarily all, embodiments, at least one of the first and second antenna systems support communication using a Multiple Input, Multiple Output antenna technology, and the Multiple Input, Multiple Output mode of operation may be implemented using Time Division Duplex techniques.

According to various, but not necessarily all, embodiments, at least one of the first and second antenna systems support communication using a Multiple Input, Multiple Output antenna technology, and the Multiple Input, Multiple Output mode of operation may be implemented using Frequency Division Duplex techniques.

According to various, but not necessarily all, embodiments, the first and second antenna systems are configured to support Multiple Input, Multiple Output antenna technologies which both utilise either Time Division Duplex communication techniques or Frequency Division Duplex techniques.

According to various, but not necessarily all, embodiments the first configuration comprises substantially all of the plurality of antenna elements configured for use as a single array.

According to various, but not necessarily all, embodiments the first configuration comprises an array of all of the plurality of antenna elements.

According to various, but not necessarily all, embodiments the second configuration comprises: at least two sub arrays formed from the one or more grouping of the plurality of antenna elements.

According to various, but not necessarily all, embodiments the method comprises feeding a signal to the first configuration and second configuration such that the resulting radiation pattern from each antenna configuration has a coincident boresight direction.

According to various, but not necessarily all, embodiments the antenna gain of the first configuration differs from the antenna gain of the second configuration.

According to various, but not necessarily all, embodiments one of the first and second antenna configurations is configured to support Single Input, Single Output antenna technology within a wireless communication network.

According to various, but not necessarily all, embodiments the method comprises configuring the apparatus to transmit a signal supporting a first communication link according to a first mode of Multiple Input, Multiple Output operation using the first configuration and to receive a signal supporting a second communication link according to a second mode of Multiple Input, Multiple Output operation using the second configuration.

According to various, but not necessarily all, embodiments the method comprises configuring the apparatus to operate in a wireless communication network, wherein the first and second configurations are configured to support transmission within the wireless communication network using a first set of one or more frequencies; and the first and second configurations are configured to support reception within the wireless communication network using a second set of one or more frequencies.

According to various, but not necessarily all, embodiments, the first and second sets of frequencies differ.

According to various, but not necessarily all, embodiments, concurrent communication links within the wireless communication network can be supported using the first and second sets of one or more frequencies.

According to various, but not necessarily all, embodiments, the method comprises configuring the apparatus to operate in a wireless communication network, wherein the first and second configurations are configured to support Frequency Division Duplex communication within the wireless communication network according to different Multiple Input, Multiple Output antenna technologies in transmission and reception.

According to various, but not necessarily all, embodiments, the method comprises configuring the apparatus to operate in a wireless communication network operating using Frequency Division Duplex techniques, wherein the wherein the first configuration is configured to transmit radiation at the plurality of antenna elements according to a first Frequency Division Duplex frequency regime and the second configuration is configured to receive radiation at the plurality of antenna elements according to a second Frequency Division Duplex frequency regime.

According to various, but not necessarily all, embodiments the method comprises configuring the apparatus to operate in a wireless communication network, by configuring the first configuration for transmission of radiation from the plurality of antenna elements and configuring the second configuration for reception of radiation at the plurality of antenna elements and performing the transmission and reception consecutively.

According to various, but not necessarily all, embodiments the method comprises configuring the apparatus to operate in a wireless communication network operating using Time Division Duplex techniques, such that the first configuration is used to transmit radiation from the plurality of antenna elements in a Time Division Duplex transmission timeslot and the second configuration is used to receive radiation at the plurality of antenna elements in a Time Division Duplex reception timeslot.

According to various, but not necessarily all, embodiments the method comprises providing at least one processor and at least one memory including computer program code for one or more programs, the at least one memory and configuring the computer program code to, with the at least one processor, cause the apparatus at least to: receive an indication of timings of transmission and reception timeslots in support of a communication link within a wireless communication network; configuring the plurality of antenna elements to operate in accordance with the first configuration in a transmission timeslot; and configuring the plurality of antenna elements to operate in accordance with the second configuration in a reception timeslot.

According to various, but not necessarily all, embodiments the method comprises providing circuitry and configuring that circuitry to detect an indication of timings of transmission and reception timeslots in support of a communication link within a wireless communication network and to control reconfiguration of the plurality of antenna elements to operate in accordance with the first configuration in a transmission timeslot; and reconfigure the plurality of antenna elements to operate in accordance with the second configuration in a reception timeslot, in dependence upon the detected indication of timings.

According to various, but not necessarily all, embodiments the method comprises: providing radio frequency circuitry and configuring that circuitry to couple a signal into and out of the plurality of antenna elements via one or more input and output ports; the radio frequency circuitry being reconfigurable between: a first arrangement in which a signal is coupled to one or more input and output ports, coupled to the plurality of antenna elements to allow operation of the apparatus in the first configuration; and a second arrangement in which a signal is coupled to one or more further input and output ports, wherein the further input and output ports are coupled to the plurality of antenna elements to allow operation of the apparatus in the second configuration.

According to various, but not necessarily all, embodiments the antenna array elements are configured to operate in the sub-6 Ghz frequency range.

Further particular and preferred aspects are set out in the accompanying independent and dependent claims. Features of the dependent claims may be combined with features of the independent claims as appropriate, and in combinations other than those explicitly set out in the claims.

Where an apparatus feature is described as being operable to provide a function, it will be appreciated that this includes an apparatus feature which provides that function or which is adapted or configured to provide that function.

BRIEF DESCRIPTION

Some example embodiments will now be described with reference to the accompanying drawings in which.

Figure 6:
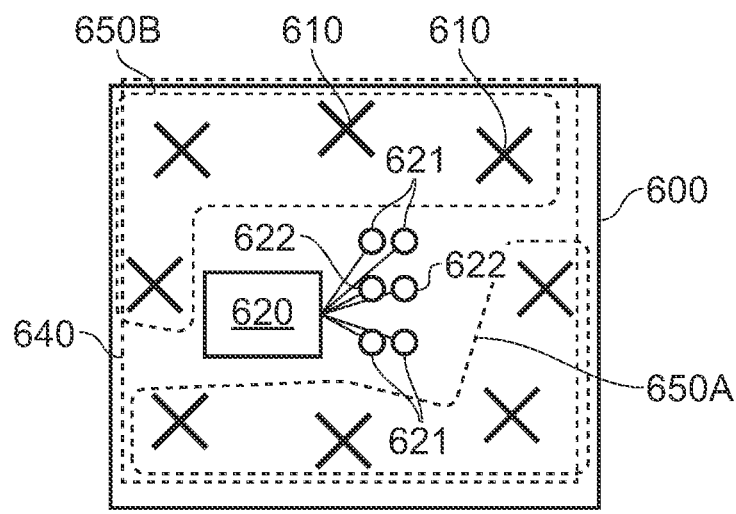
FIG. 6 shows an example embodiment of the subject matter described herein in one possible implementation of a reconfigurable antenna element array is shown schematically.
Figure 8:
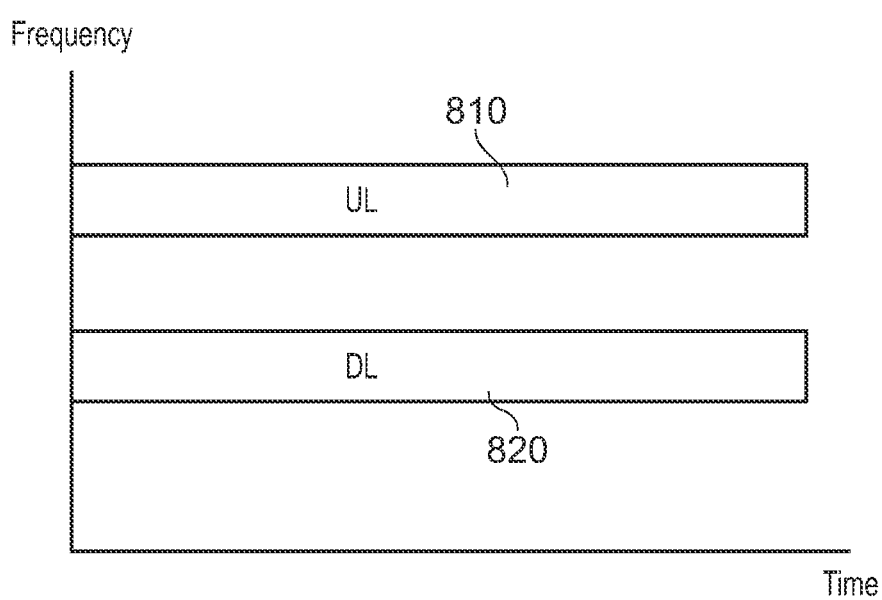

FIG. 8 shows an example embodiment of the subject matter described herein in which a Frequency Division duplex (FDD) transmission and reception protocol within a wireless communication network is illustrated; and FIGS. 9a, 9b, 10a, 10b, 11 and 12 show example embodiments of the subject matter described herein in which various RF circuitry arrangements are configurable to support reconfiguration of a multi-element antenna array to operate as shown schematically in, for example, FIG. 6.

DETAILED DESCRIPTION

Before discussing the example embodiments in any more detail, first an overview will be provided.

Operational components of various types exist within wireless communication networks. One common type of operational component comprises "user equipment (UE)". A UE comprises an electronic device which is used by an end user, for example, at a place of work, their home, or in public. UE devices are usually such that the purchaser is able to use and/or install it as required without recourse to a specialist technician. In other words, a UE is not, for example, a Mobile Network Operator base station which requires specialist knowledge to setup, configure, install and test.

As described above, increasing demand on wireless communication networks has led to adaptation and development of various UE devices.

A UE may be one or more of, or part of one or more of: a FWA/CPE device; a smartphone or mobile phone; a consumer electronic device, a portable electronic device or wearable electronic device (i.e. a device which a user can pick up and carry); a moveable apparatus (e.g. a UE maybe mounted on/installed in something which can be moved either by a human &/or via computer instructions, i.e. a vehicle (drone/car/bike/plane/boat/or similar), generally such UE devices maybe too heavy to carry or wear but can be moved if required to change their location or position; alternatively they may be fixed in place within the vehicle somewhere but if unmounted could easily be picked up & re-located as they are lightweight; a laptop/tablet/navigation device/music player/video player/gaming device or similar; a robot. In other words, it is possible for various devices, including, for example, a vehicle, to be termed a "communication apparatus" since most, if not all, vehicles and other devices now, and in the future, have at least one radio device integrated somewhere.

Whilst the embodiments described in detail below of use in relation to UE which fall into a FWA/CPE device category, it is believed that the concepts described may be applicable to other UE devices, including the various types of UE device specifically mentioned above.

Provision of components suited to a fixed wireless access point as a network access node maybe considered to sit between typical hardware components manufactured for traditional wireless network nodes such as user equipment and cellular network base stations. It will be appreciated that FWA products can benefit if implemented with antenna apparatus, for example, array antennas, which have been adapted to suit particular requirements of a FWA deployment. It will also be appreciated that there may be specialist user equipment and/or base station deployments which could also benefit from the particular adaptations of relevance to a FWA deployment.

In an ideal FWA deployment, a network access point is such that it has a fixed position at a location and is configured to provide users in that location with a communication signal with relatively high radio frequency (RF) power and gain to support strong and fast information and data transfer. Yet a FWA point device is required to not be too large or cumbersome and not too expensive to manufacture or maintain, since it falls into the "UE" equipment category described more generally above.

Current antenna apparatus component manufactures typically provide optimised antennas and antenna arrays, including those set to operate in various radio networks, suited to use either in mobile handsets/user equipment or in cellular network base stations. UE antenna deployments are typically subject to very specific small size and low RF power restrictions. Traditional cellular network base station deployments can be large, expensive, and typically operate at a high RF power.

It has been recognised that new requirements and operational techniques deployed in a wireless communication network create a need for different types of antenna arrangements. For example, antenna apparatus may be required to support a high gain signal yet be subject to significant size and cost constraints. Such antenna arrangements may, for example, be suited to use in a typical FWA CPE device.

It is recognised that a differently adapted antenna apparatus may be of benefit to FWA device deployments. That is to say, it is recognised that it can be advantageous to provide antenna apparatus suited to use in, for example, a FWA deployment, or in other deployments having similar requirements and/or operational constraints. Furthermore, it is recognised that antenna apparatus may be adjustable or reconfigurable, subject to particular deployment conditions, to be optimised for those different deployment conditions.

By way of providing a framework in which to consider a new antenna apparatus, particular adaptations which address various requirements and operational constraints of relevance to a FWA device deployment are now discussed.

Figure 1A:
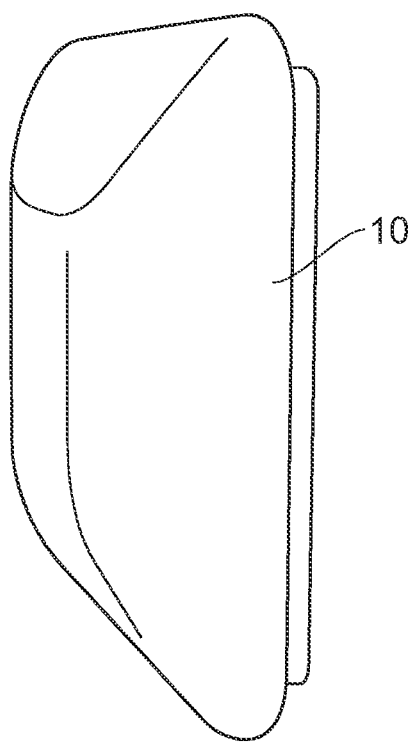
FIG. 1a to 1d show an example embodiment of the subject matter described herein in which various aspects of the appearance of a typical outdoor fixed wireless access point are illustrated.
Figure 1B:
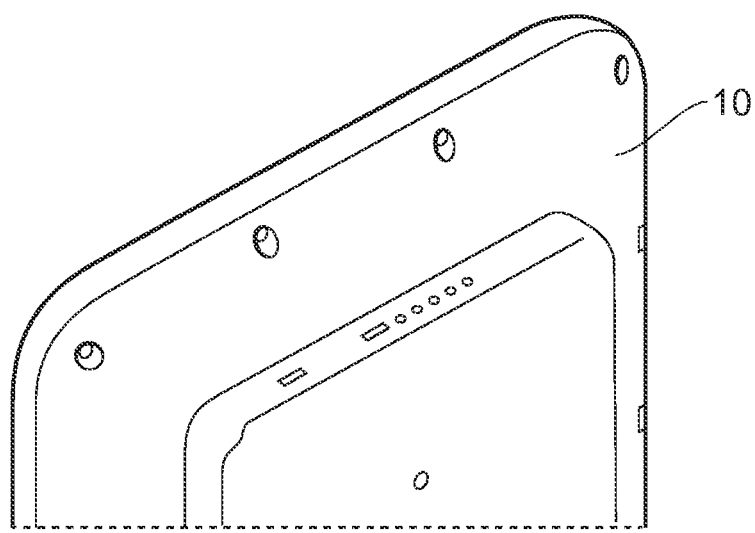
Figure 1C:
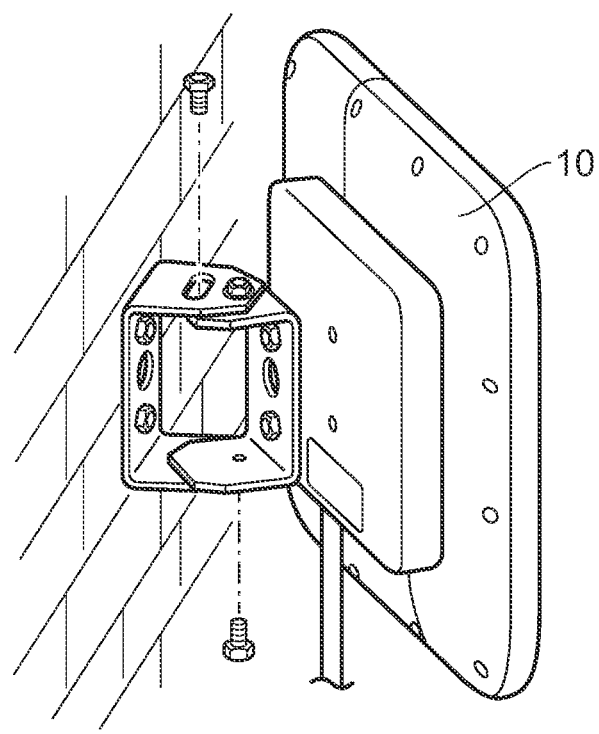
Figure 1D:
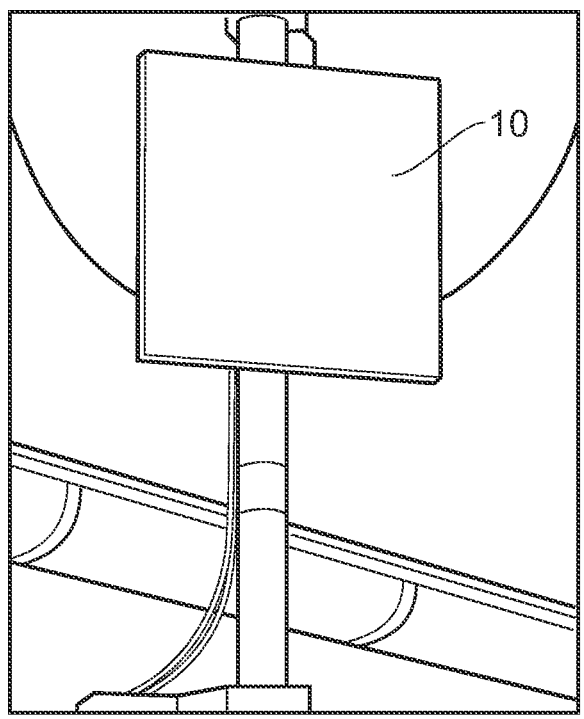

FIGS. 1a to 1d illustrate various restrictive aspects in terms of physical characteristics of a typical outdoor fixed wireless access point. In particular, FIG. 1a and FIG. 1b illustrate one possible housing 10 of a FWA antenna array, and FIG. 1c and FIG. 1d illustrate primary deployment options in relation to an outdoor FWA device, namely: wall mount and pole mount respectively. Typical FWA housings 10 include one or more mounting bracket which allows for alignment of, for example, a narrow beam, high gain antenna beam, towards a direction of arrival of a radio signal received from a base station forming part of a traditional wireless communication network.

Figure 1E:
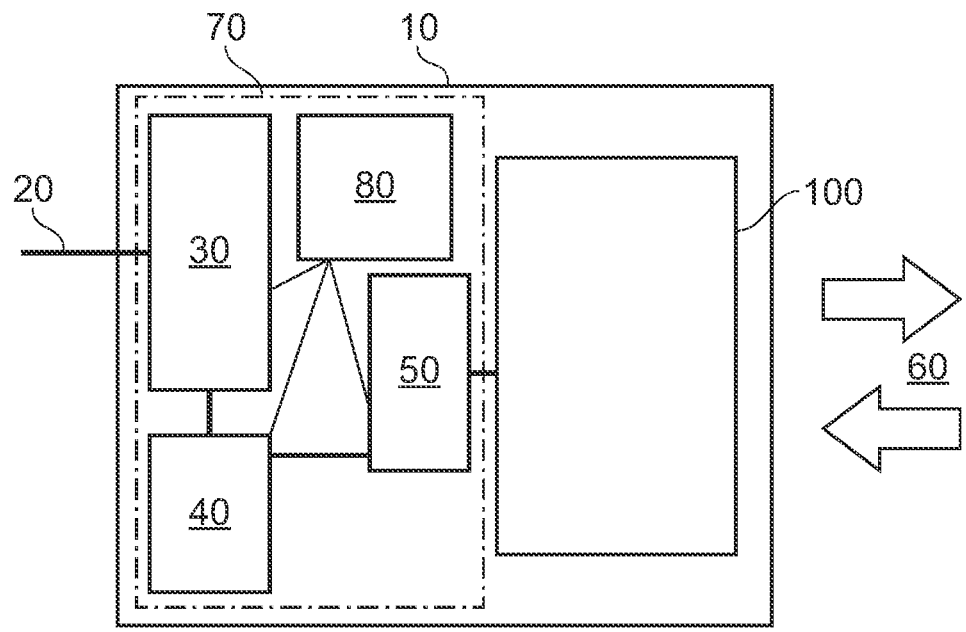
FIG. 1e shows an example embodiment of the subject matter described herein in which some main components of a fixed wireless access point are shown.

FIG. 1e shows some main components of an FWA CPE within the housing 10. After installation of a FWA CPE in a location, typically an ethernet cable 20 is connected to the FWA device which is operable to transfer data in and out of the device via a modem 70 to a Wi-Fi gateway device located inside, for example, a consumer or user residence, place of work, factory, office or similar. Often it is possible to power a modem 70 provided within an FWA device using a power over ethernet protocol. As such, the ethernet cable 20 is configured to provide that alternating current (AC) power to a modem provided within the FWA device. The modem 70 comprises a baseband processor 30; Radio Frequency Integrated Circuit (RFIC) 40 including digital to analogue converters; Radio Frequency Front End (RFFE) 50 composed of, for example, analogue RF components such as amplifiers, switches, and various kinds of filters; and an integrated circuit 80 which functions to provide power management, in particular, to control AC and DC power functions of the modem subsystems.

The modem 70 comprises digital to analogue and analogue to digital converters and RF circuitry which is in communication with antenna apparatus 100 to transmit and receive signals 60 within a wireless communication network.

It is possible to use antenna arrays as the antenna apparatus 100. A small antenna array structure, for example, a one by four patch array of a type which might be used in a mobile handset, has reasonable scanning capability in at least one direction and therefore may provide a region of network coverage in a FWA deployment. Such small antenna arrays are particularly suited to FWA deployments in terms of size and cost. However, straight reuse of such user device antenna arrays can suffer from disadvantages in relation to the limited radio frequency (RF) power and antenna gain levels which can be provided. That is to say, the RF power and antenna gain levels which support effective operation of a standard mobile handset may be less adequate when used to support operation in other UE devices, for example, operation of a FWA CPE.

A base station array antenna structure, capable of supporting required RF power and antenna gain levels for operation of a base station, may typically be physically large, and may have large RF power requirements and may have significant cost disadvantages in relation to reuse in a FWA deployment.

Nonetheless, it is possible to appreciate various possible advantages which might be realised at a FWA device or other UE device having similar operational requirements if a suitable antenna array can be provided. By way of example: a typical high gain outdoor FWA receiver could advantageously include antenna implementations which support MIMO communication within a radio communication network.

Increasingly radio systems utilise Multiple Input, Multiple Output (MIMO) technology. There are many types of MIMO systems currently in use and different MIMO radio manufacturers offer their own versions of MIMO technology configurations with unique features and advantages. Various MIMO implementations are possible and a MIMO communication implementation can result in a much more adaptable dynamic network, operable in a manner which can support large and efficient overall data transfer.

It will be appreciated that MIMO communication operates such that the same data can be sent as several signals simultaneously through multiple antennas, whilst, for example, still using a single radio channel. In short, MIMO is a form of antenna diversity and uses multiple antennas to improve signal quality and strength of an RF link. Typically, implementation of MIMO systems is such that data or information to be sent is split into multiple streams at the point of transmission and recombined on the receive side by another MIMO-capable radio configuration having the same number of antennas. Signal processing provided at both ends of a send and receive chain are designed to implement the splitting of the data and to take into account time differences between reception of a plurality of signals to accommodate noise, interference and lossy received signals.

By transmitting the same data on multiple streams, a MIMO radio configuration allows for introduction of redundancy into data transmission that typical signal data transfer arrangements, for example, Single Input, Single Output (SISO) arrangements, are unable to provide.

MIMO systems may provide some advantages over a typical single input single output arrangement. In particular, MIMO radio systems are particularly suited to utilise bounced and reflected radio frequency transmissions to improve overall received signal strength even without a clear line of sight between transmitter and receiver. This can be particularly useful in urban environments where multi path propagation is very common and where obtaining a clear line of sight between a base station and user equipment can be a major issue. Overall throughput in an urban deployment of nodes within a wireless communication network can be improved by a result of use of MIMO techniques. MIMO operation allows for greater quality and quantity of transfer of data, and therefore supports services having a high quality of service requirement, for example, video. Utilisation of multiple data streams mitigates issues such as fast fading and other losses, including dropped data packets.

Increasingly, 4G and 5G network capable devices have a requirement for provision of a degree of MIMO capability. Various MIMO implementations are possible and a particular MIMO mode of operation can be selected to support optimal transmission and reception given constraints including: available hardware, software, and device deployment considerations. Typical MIMO configurations include 2×2 MIMO (2 transmit antennas, 2 receive antennas); 4×4 MIMO (4 transmit antennas, 4 receive antennas) and 8×8 MIMO (8 transmit antennas, 8 receive antennas).

Generally speaking, the more antennas the system has, the more simultaneous data streams can be transmitted. However, MIMO operation comes at a cost: higher MIMO rate necessitates provision of more transmitters and receivers in a device which results in an increase in device price, complexity and power consumption. Furthermore, provision of a greater number of antennas can result in additional significant space requirements and may result in compromises in relation to other aspects of operation of a device within a telecommunications network. In short, provision of more antennas and the support of MIMO operation does not always directly equate to overall better system performance.

The standards requirements in relation to 4G and 5G networks and the operational advantages offered by MIMO operation within a telecommunications network, mean that typical FWA devices are provided with antenna equipment which supports, or can be configured to support, MIMO operation.

MIMO antenna requirements are such that a 4×4 MIMO mode of operation is supported by 4 antennas. This can be 4 distinct antennas or two cross polarised antennae. Similarly, 2×2 MIMO operation can be supported by two distinct antennas or a single antenna, provided it is cross polarised. A mix of distinct, cross polarised and antenna arrays can be used to provide antennas in support of MIMO operation. If a fixed device size is assumed, for example, in implementations such as a FWA CPE device, mobile computing device, user equipment, vehicle or similar, antenna array implementations which support both 4×4 and 2×2 MIMO are such that a 2×2 MIMO downlink arrangement may have twice the number of spaced antenna elements forming an array compared to implementation for a 4×4 MIMO download link configuration where those same spaced elements need to form two separate antenna sub-arrays. As a result, the 2×2 MIMO downlink implementation will typically result in an antenna array provided at a device which can provide higher gain, for example, 3 dB higher gain in one typical frequency wireless communication network implementation, compared to the gain available in a 4×4 MIMO antenna array configuration. It will be appreciated that the gain difference may be greater than the theoretical 3 dB gain suggested above since mutual coupling and cross-talk between two very closely located antenna arrays in a 4×4 MIMO configuration may increase the gain difference between the "single" antenna formed by an array and a "pair" of sub-arrays formed from the same array elements to around 4 to 4.5 dB.

In an urban environment, providing a device which supports 4×4 MIMO can result in significant improvements to overall device operation. In such an urban environment, base stations are typically in close proximity to end user devices and the high density of buildings and other reflectors in an urban environment can result in significant multipath propagation. In such a deployment environment higher MIMO ranks 3 and 4 are often utilised and an improvement in overall network operation achieved.

In contrast, relatively static devices intended for use in more rural environments are such that the advantages of high rank MIMO operation diminish. In a rural environment or suburban environment there is typically a large distance between a nodeB and a UE. That distance results in a lower received signal strength in downlink. Furthermore, radio signal propagation in rural or suburban environments are typically subject to fewer reflections from buildings compared to a purely urban environment. In such a deployment, higher MIMO ranks 3 and 4 are more seldom achieved or applicable.

In some deployments, it may be advantages to use single input, single output (SISO) communication techniques, at least for the purposes of transmission of a signal.

Figure 2A:
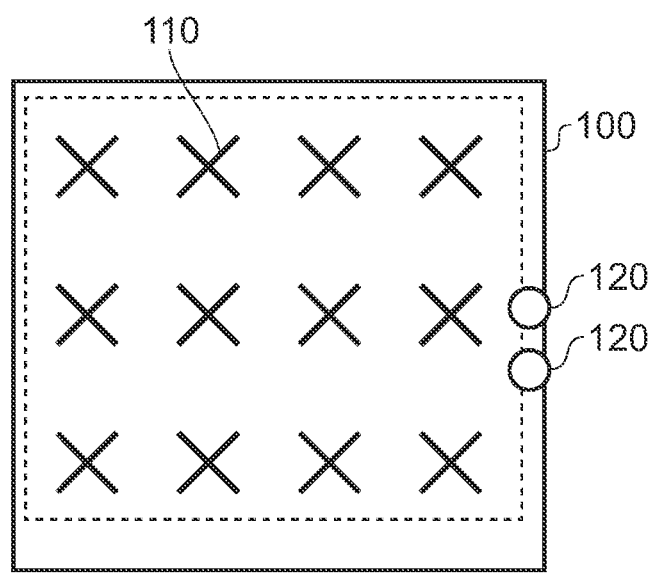
FIGS. 2a and 2b show an example embodiment of the subject matter described herein in which a schematic configuration of antenna elements to support MIMO operation in such apparatus is illustrated.
Figure 2B:
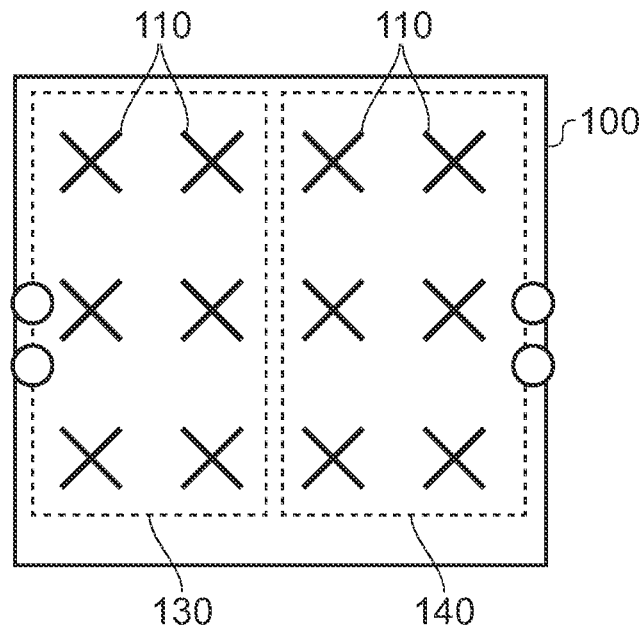

FIGS. 2a and 2b illustrate schematically for an array of antenna elements within a restricted or fixed space or physical size a manner in which they may be configured to support either 2×2 or 4×4 MIMO operation respectively. For a device 100 of a given size it can be seen in FIG. 2a that a 12 element, 4 column, 3 row (4×3) antenna element array comprising dual polarised antenna array elements 110 is provided. Ports for RF reception and/or transmission 120 at the antenna array are provided. FIG. 2b illustrates a device 100 of the same size as that shown in FIG. 2a in which, 12 dual polarised antenna array elements 110 are provided, a configuration in which the 12 element antenna array can be operationally split into two sub arrays: array 130 and 140 respectively. Each of those sub arrays 130, 140 is provided with radio frequency ports for use in relation to reception and/or transmission of a RF signal.

It can be advantageous, in terms of support of good communication links in a wireless communication network, to use high rank MIMO in user equipment downlink configuration, thereby supporting antenna diversity and allowing for mechanisms to mitigate dropped packets and other losses, compared to a rank 1 or 2 MIMO configuration. However, for a device of restricted size, the impact of a 3 to 3.5 dB antenna gain difference as a result of a need to provide multiple antennae has a much greater impact in relation to user equipment uplink communications and provision of a higher rank MIMO capability can significantly limit radio coverage of a device. In other words, the advantages offered by MIMO in the downlink may not be sufficiently compensated for in relation to the compromises made in device uplink operation.

User equipment uplink antenna gain is perhaps the most important operational parameter in a high gain outdoor receiver deployment. In a typical use case uplink gain defines the achievable coverage range for a device, for example, user equipment or FWA CPE. It will be appreciated that there is a significant imbalance in relation to traditional Radio Access Network nodeB transmit power (150 watts with antenna gain of 25 dB) and that of user equipment or FWA CPE devices (0.2 watts to 0.4 watts with antenna gain of between 17 and 20 dB). As such the uplink operation of the user equipment or FWA device typically determines whether effective communication can be effectively sustained with a communication network supported by traditional high RF transmit power base stations.

Figure 3:
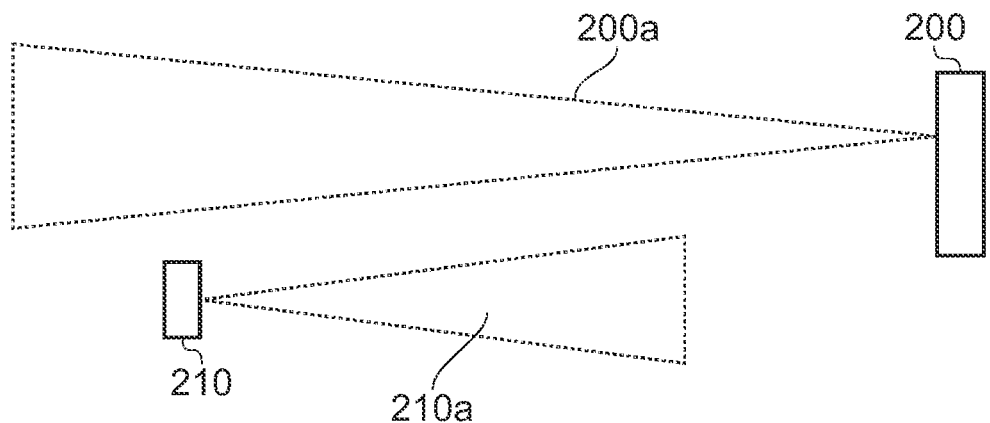
FIG. 3 shows an example embodiment of the subject matter described herein in which a difference in transmitted RF power and coverage between a traditional base station and a user equipment in a wireless communication network is shown schematically.

FIG. 3 illustrates schematically the described difference in RF power and radiation pattern coverage between a traditional base station 200 forming part of a telecommunication network and a user equipment or fixed wireless access consumer premises equipment device 210. It can be seen that a traditional base station 200 having large and powerful radio (antenna and RF transceiver) equipment can provide radio coverage across a larger distance illustrated schematically by the cone 200a compared to a device 210 having a relatively lower transmit power and a relatively lower antenna gain and having an indicative coverage area shown by cone 210a.

5G technology offers some benefits to operation of user devices, particularly the ability to use a new region of radio spectrum and wider channel bandwidths. It will be appreciated that there are new 5G radio bands in the sub-6 GHz band and several hundreds of MHz spectrum and 100 MHz channel bandwidth for single component carriers available according to the 5G protocol, for example n41 (2.5 GHz), n77 (4.2 GHz) n78 (3.5 GHz) and n79 (4.8 GHz) available within the 5G protocol. All of those bands are such that they use TDD (time division duplex) transmission and reception regimes. These "new" bands of available radio spectrum are those which will allow operation of user equipment devices, including fixed wireless access service devices, and wireless communication networks evolve. The new bands may be particularly suited to provision of a FWA service, since the wide channel bandwidth can enable Gbps speeds in terms of data transfer.

Figure 4:
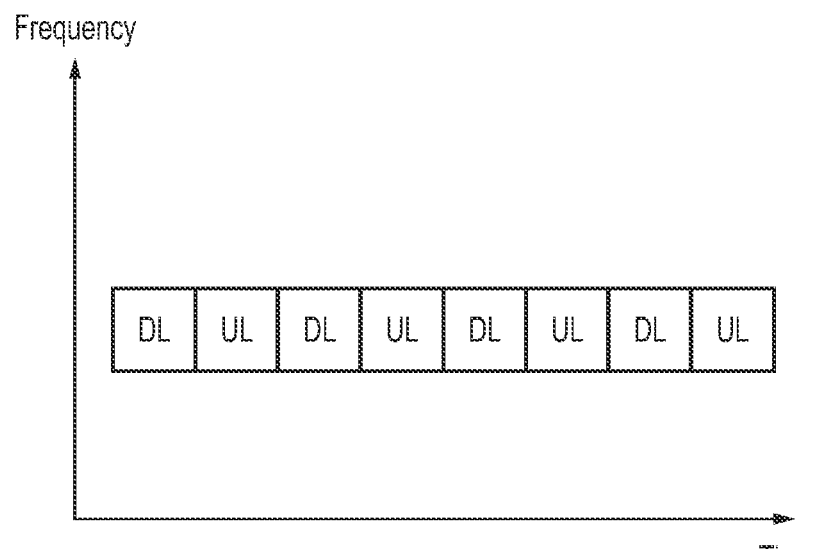
FIG. 4 shows an example embodiment of the subject matter described herein in which a Time Division Duplex (TDD) transmission and reception protocol within a wireless communication network is illustrated.

FIG. 4 illustrates schematically a time division duplex (TDD) transmission and reception protocol. It can be seen that the downlink and uplink between nodes in a network operating in a TDD manner are separated in terms of time but are common in terms of frequency. That is to say, uplink and downlink communication is scheduled in different, non-overlapping, time slots.

Having set up the general framework in which examples of different antenna configurations may be useful, it is possible to set out a particular problem which may be encountered in relation to successful device deployment. The issue described may be particularly relevant to FWA devices, but may also occur in relation to other UE devices.

Most 4G receivers used for long range or rural FWA implementations have been designed for user equipment operating with a 2×2 MIMO or SISO radio configuration. This configuration can be supported at a device using a single dual-polarised antenna array. Such an arrangement achieves maximum antenna gain for a fixed array size thereby achieving maximum user equipment uplink performance or FWA device uplink performance and therefore maximum FWA service coverage.

5G 3GPP standards make mandatory a requirement for user equipment and user devices to support 4×4 MIMO downlink operation at, for example, bands n77 and n78. Those bands are currently the most preferred bands for FWA service across the globe. Device uplink can be provided such that either single output uplink or 2×2 uplink MIMO is supported.

Standards also set out a maximum permissible device transmit power (currently 26 dBm) by class of device.

It will be appreciated that the particular requirements of standards can result in implementation issues and conflicts. For example, the need to provide 4×4 downlink capability means that devices, may have a maximum antenna gain (and therefore coverage area) which is reduced by 3 to 5 dB when moving from a 4G to a 5G implementation assuming that there is an overall a limitation on maximum or set device or antenna size and that arrays of antenna elements are used to provide the 4×4 MIMO capability.

Various antenna arrangements, suitable to support 4G and 5G operation, of a device are possible.

Described arrangements provide a multi-element antenna array which can be configured to support different modes of communication within a wireless communication network and an antenna array configuration method in which elements of an antenna array can be provided to support more than one mode of communication within the wireless communication network. In some arrangements, different functional configurations of the antenna array elements may be provided be such that each arrangement of antenna array elements results in effective antennae which have the same boresight direction. Having a fixed and common boresight direction can be helpful in a fixed device scenario. Some implementations of a flexible configuration of elements of an antenna array may be such that the functional antenna provision can differ in relation to uplink and downlink operation in a TDD or FDD mode of operation. That is to say, in relation to a TDD implementation, arrangements may support a rapid reconfiguration of the elements of an antenna array between time slots in an established and operational radio link between nodes.

Figure 5:
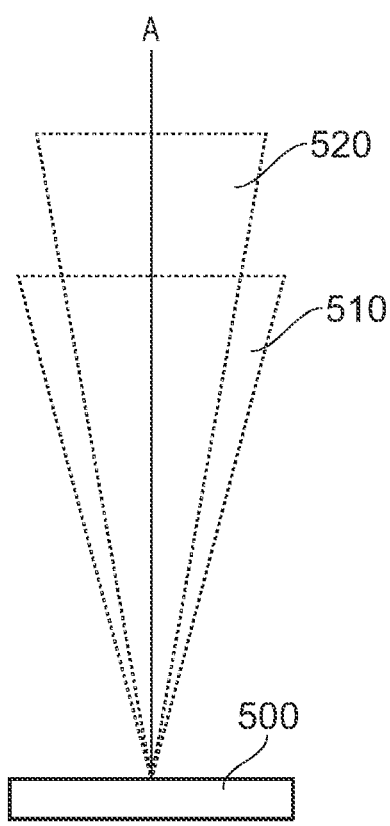
FIG. 5 shows an example embodiment of the subject matter described herein in which some main principles of one possible antenna arrangement are illustrated.

FIG. 5 illustrates schematically some main principles of one possible antenna array arrangement. FIG. 5 illustrates a low RF power user equipment device such as a mobile phone or FWA receiving device 500. The device 500 includes a plurality of antenna elements which together form an antenna array. Each element in the array shown is a dual polarised antenna element.

The array of FIG. 5 is configured such that it can provide transmission according to one effective antenna array configuration and support reception according to another effective antenna array configuration. By way of example, transmission may be supported using a configuration where the entire array forms one antenna and provides single input and single output (SISO) operation. An alternative configuration for transmission may be providing that the antenna array supports 2×2 MIMO communication, the whole array being used, but the cross-polarisation of each antenna array element is taken into account. An array forming a single antenna (in the case of SISO operation) supports a higher antenna gain and consequently greater coverage area. A representation of that coverage being illustrated schematically in FIG. 5 via triangle 520.

The antenna element array can be configured to also support a different mode of communication within a network. For example, the entire array of elements can be functionally "split" to form 2 separate antenna element arrays, each being a sub-array of the entire array. Such an antenna configuration is such that the antenna array effectively provides a lower antenna gain, but can support 4×4 MIMO operation. The region of coverage which maybe supported if the sub-array antenna arrangement were also used for transmission is shown representationally as triangle 510.

Arrangements provided are such that a flexible and adaptable configurable antenna formed from a plurality of antenna elements is provided. The antenna array can be configured such that it supports various different effective antenna configurations, for example, a single antenna, two antennas, four antennas and similar. When a single antenna is provided, the entire array of elements can be utilised, or substantially all of the array elements may be utilised. When supporting more than one effective antenna, the array may be configured to operate functionally as two or more sub-arrays. The sub-arrays may be substantially equal in size and may be formed by one or more sub-groupings of the antenna array elements. The sub-arrays may be substantially similar in shape.

By way of example, an antenna array formed from a plurality of antenna elements may be configured to operate in a first configuration in which substantially all elements of the array together form a single, dual polarised, antenna. Such an antenna can be used to support single input single output (SISO) operation or, given the dual polarised antenna array element nature, 2×2 MIMO operation.

The same basic array of antenna elements may also be configured or reconfigured such that it effectively functions as two or more sub-arrays. The reconfiguration of the antenna array may be such that two sub-arrays are formed from the available antenna elements, each comprising a subset, for example, half, of all available antenna array elements. Such a pair of sub-arrays, given the cross-polarised nature of the antenna elements, can be used to support 4×4 MIMO operation.

The full antenna array and the sub-array configurations described may be such that both antenna configurations have the same boresight direction. According to some arrangements the antenna array arrangement and reconfiguration can be implemented in a manner which supports TDD RF signalling between nodes in a communication network. In such implementation, uplink communication (transmission of a signal) may use one configuration of the antenna array and downlink communication (reception of a signal) may use a different configuration of the array. The effective number of antenna formed, supported or utilised by the array may differ in relation to transmission and reception. The antenna array elements may, for example be connected and configured such that they form a full single antenna array during TDD transmission and, for example, may be reconfigured into two or more sub-arrays, during TDD reception time slots. Such reconfiguration between transmission and reception slots can enable the use of maximum antenna gain for transmission of signals by a device and yet also support maximum MIMO gains in relation to signals received by the device.

FIG. 6 is a schematic representation of one possible implementation of a configurable antenna element array. Such a configurable antenna array may be suited to be used by a FWA transceiver device. The antenna array 600 shown in FIG. 6 comprises 16 effective antenna array elements, provided physically as eight dual polarised antenna array elements 610 and a radio frequency circuit 620 which supports RF transmit and receive reconfiguration of the array, examples of which are described in more detail below.

The general apparatus structure shown in FIG. 6 is such that an antenna array is provided, the antenna array comprises eight dual polarised antenna array elements, each a cross polarised dipole, and which form, if used all together, a "full array" of 16 effective antenna array elements and can provide a 16 antenna element array configuration in support of single effective antenna. That full array configuration is indicated by dashed line 640 which encircles all eight dual polarised antenna array elements 610.

In an alternate configuration, the full array of sixteen antenna array elements (8 dual polarised antennas) can be functionally split into groupings which together form sub-arrays, each supporting an antenna. Splitting the complete array into sub-arrays can provide a different antenna configuration. In the example shown, the different antenna configuration is the provision physically of two antenna element subarrays 650a, 650b. Each of the subarrays 650a, 650b comprises four of the eight dual polarised antenna elements. The different polarisations can be utilised separately, so a physical grouping of the dual polarised antenna elements into two can provide four separate effective antennae. For the sake of simplicity, the feed network interconnects used for dividing radio frequency signals to the individual antenna elements of the array are not shown in detail in the figure.

Figure 7A:
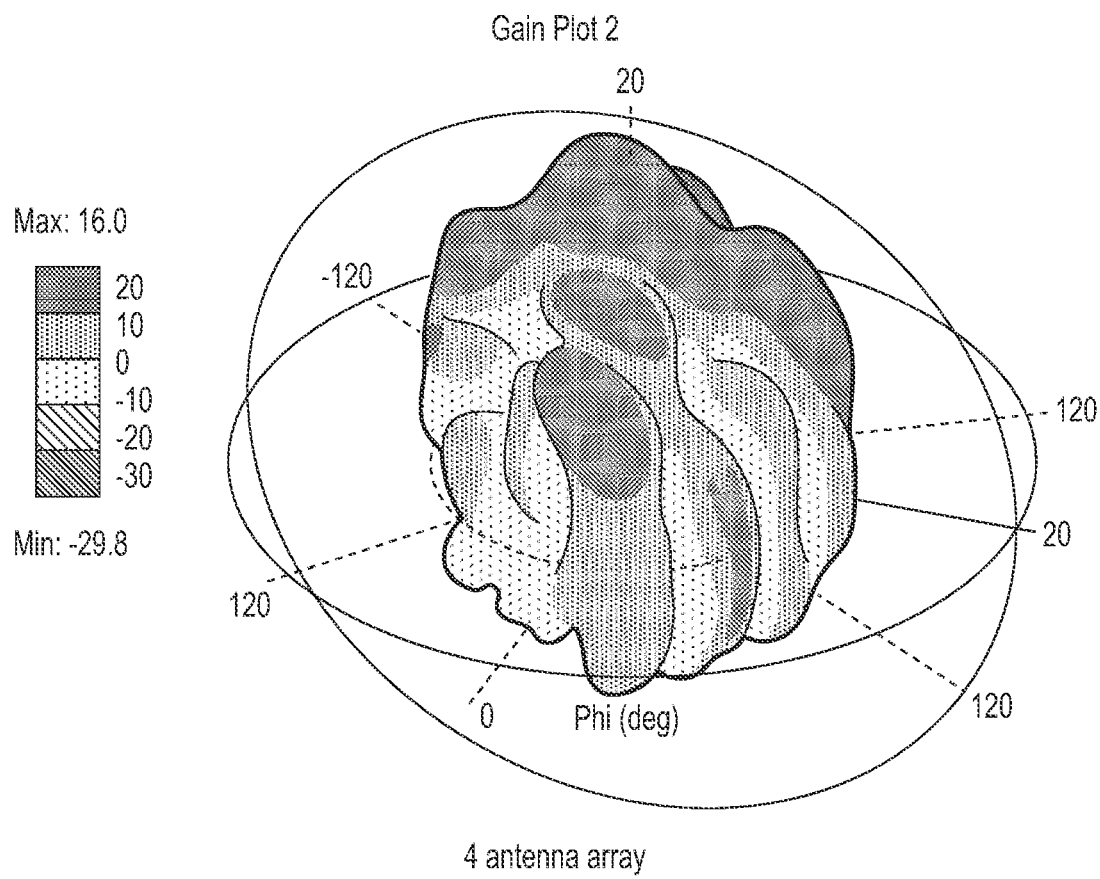
FIGS. 7a and 7b show an example embodiment of the subject matter described herein in which simulation results of antenna gain in relation to use of sub-array antennae (FIG. 7a) and a full array antenna (FIG. 7b) operating at 3.6 GHz are shown.
Figure 7B:
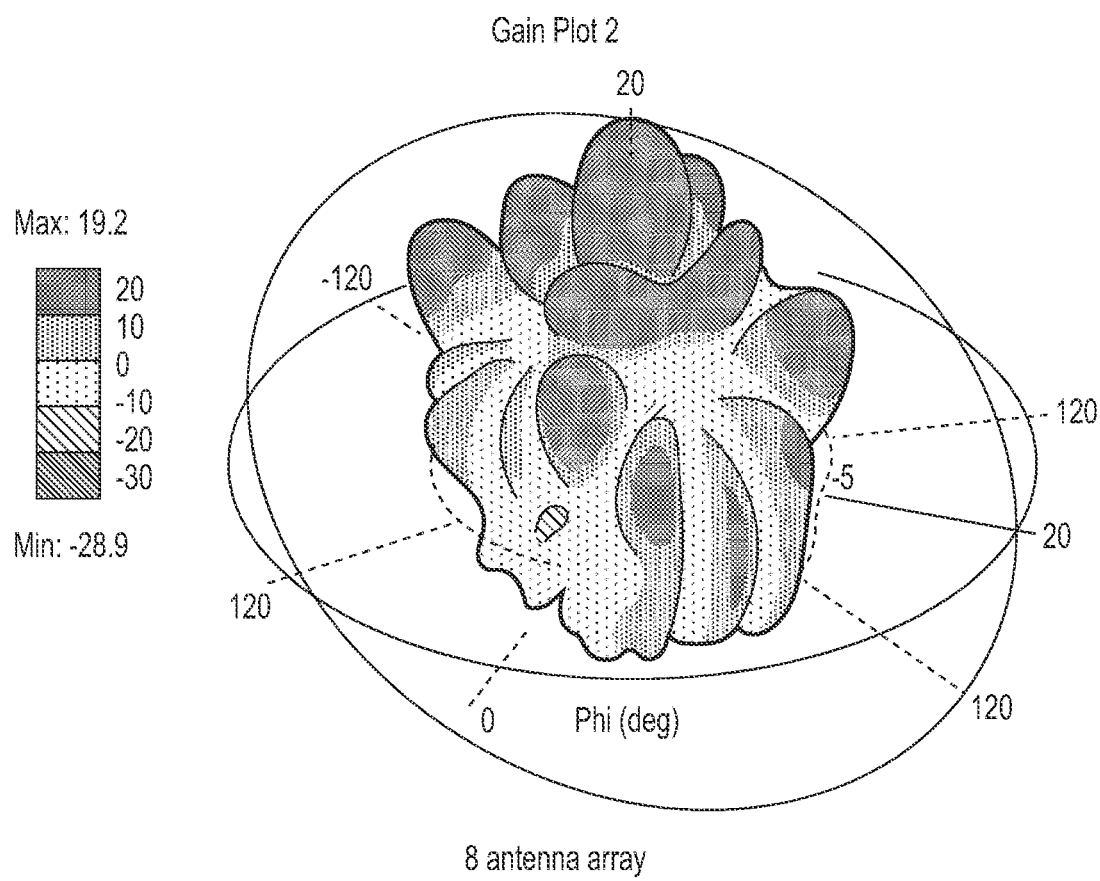

FIG. 7 illustrates simulation results of antenna gain in relation to use of the sub antenna arrays and the full array of FIG. 6 operating at 3.6 GHz. FIG. 7a is a gain plot relating to provision of two four (dual polarised antenna) element antenna subarrays and FIG. 7b is a gain plot resulting from use of a full eight (dual polarised antenna) element antenna array. It can be seen that the maximum antenna gain for the sub-array configuration is 16 dB and the maximum gain which can be achieved for use of a full antenna array configuration is 19.2 dB. In this implementation, cross polarised sub-6 GHz dipole antennas are located with respect to each other in a rectangular peripheral arrangement such that they have a relatively large separation distance and thus relatively low mutual coupling between the dipole subarrays. It will be appreciated that the same or similar RF performance could be achieved using other geometrical arrangements and spacings of antenna elements. In the implementation illustrated, the maximum gain difference between the subarray configuration and the full array configuration is 3.2 dB. If the antenna elements or antenna subarrays are more closely located, a smaller device could be achieved but the impact of mutual coupling between the subarrays would increase the gain difference between a full array implementation and the subarray implementation. FIG. 7 also illustrates that, in the case where no particular beam forming is implemented in relation to the antenna arrays, the overall boresight direction of the subarray configuration and a full array configuration can be substantially identical. Identity of boresight between configurations can be beneficial in a deployment where a device is fixed and has been located to provide a strong communication link with a particular nodeB.

FIG. 6 shows schematically, in relation to the antenna constellation of FIG. 6, one possible implementation of array antenna element feed points. The RF feed circuitry required for different configurations may be implemented in a range of ways. In particular, more RF input ports 621 are provided in relation to configurations where the array is split to form more than one antenna compared to the RF input ports 622 which may be provided to support operation of the array as a single antenna.

One possible manner in which reconfiguration of the antenna array may be performed is in support of TDD operation within a network. As mentioned above, TDD operation is such that a frequency channel used remains the same in both transmission and reception and the transmission and reception of a signal is separated in time. It is, for example, possible to arrange the antenna elements and supporting antenna feed to provide an antenna array in which downlink time slots may be supported by use of multiple antennae formed by effective functional subarrays formed from groupings of antenna array elements within an available antenna element array, thereby supporting MIMO in the downlink, for example, 4×4 MIMO operation. Furthermore, the array and RF feed circuitry may be reconfigured between uplink and downlink slots such that the uplink time slots are served by the antenna array as configured to provide a single antenna provided by a full set of antenna elements.

FIG. 8 illustrates schematically an FDD transmission and reception protocol within a wireless communication network. According to an FDD transmission and reception protocol, transmission 810 and reception 820 happen concurrently in time, but spaced in frequency.

FIGS. 9, 10, 11 and 12 illustrate various RF circuitry arrangements which can support configuration of an antenna array to operate using different effective antenna array configurations in transmission and reception. The feed circuitry illustrated may support the configuration of an array for use in one or both of a TDD or FDD transmission and reception protocol.

Figures 9A, 9B:
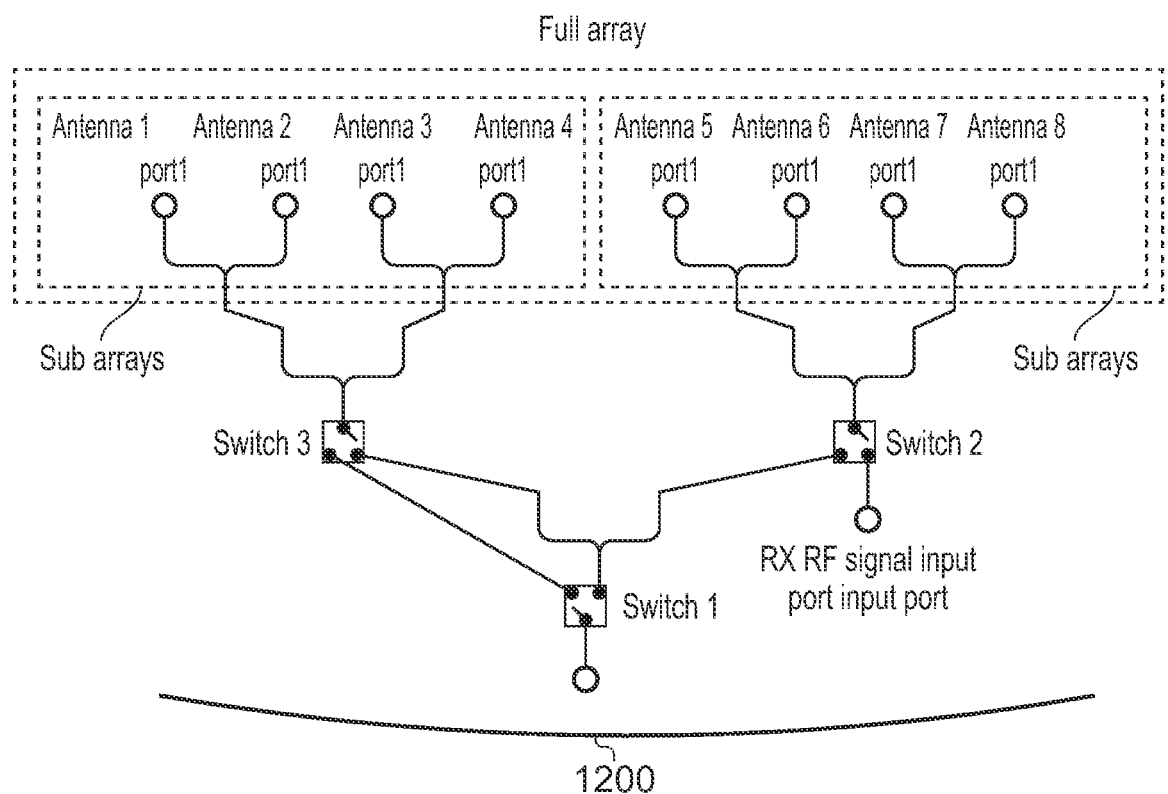

One example RF circuit 1200 which can be utilised in support of reconfiguration of an array is shown in FIG. 9a. For the sake of simplicity, the configuration illustrated relates to only one antenna port of a dual polarised antenna and just two of the RF signals (transmission and reception) are illustrated. Implementation for the second antenna port and third (RX+TX) and fourth (RX) RF signals is analogous to that shown in FIG. 9. In other words, a total number of antenna elements is 16, provided as a physical arrangement of 8 dual-polarised antenna elements. The circuitry of FIG. 9A shows just one polarization port of 8 dual polarised antenna elements, so there is an identical further circuit and antenna elements (×8) for the other polarization (i.e. a carbon copy of the arrangement of FIG. 9A). The "X" shaped elements shown in FIGS. 2A; 2B and FIG. 6 represent two basic antenna elements: "/" is a first polarization and "\" is the other polarization, making a total of 16 basic antenna elements in the array.

Implementation is based on the addition of three single pole double throw (SPDT) RF switches to an antenna array feed network. The logic controlling the RF switch components to achieve the intended outcome is also presented in FIG. 9b. The insertion loss of a single pole double throw (SPDT) RF switch component at between 2.5 and 4.2 GHz is approximately 0.2 to 0.3 dB with the result that the inclusion of switches in a RF feed network such as that shown in FIG. 9 does not cause significant increase to signal attenuation in the RF antenna feed network.

The logic for controlling the RF circuitry to support TDD reception and transmission using different configurations for each slot timings is presented in relation to the combination of FIG. 9a and FIG. 9b. The RF circuitry is used for connecting the RF signal to the full antenna array during TDD uplink (transmission) time slots and to two antenna element sub-arrays during TDD downlink (reception) time slots. Such an implementation allows for the achievement of an optimal antenna configuration or antenna beam for both transceiver uplink and downlink (transmission and reception). In particular, the reconfiguration envisaged enables maximum uplink (transmission) (single input single output or 2×2 MIMO) antenna gain and suitable service coverage and range whilst also allowing for the support of 4×4 MIMO in the downlink (reception). The antenna configurations provided can have the same antenna boresight direction which is particularly important in fixed devices which require antenna beam alignment towards, for example, a known and fixed position nodeB in a wireless network.

Figure 10A:
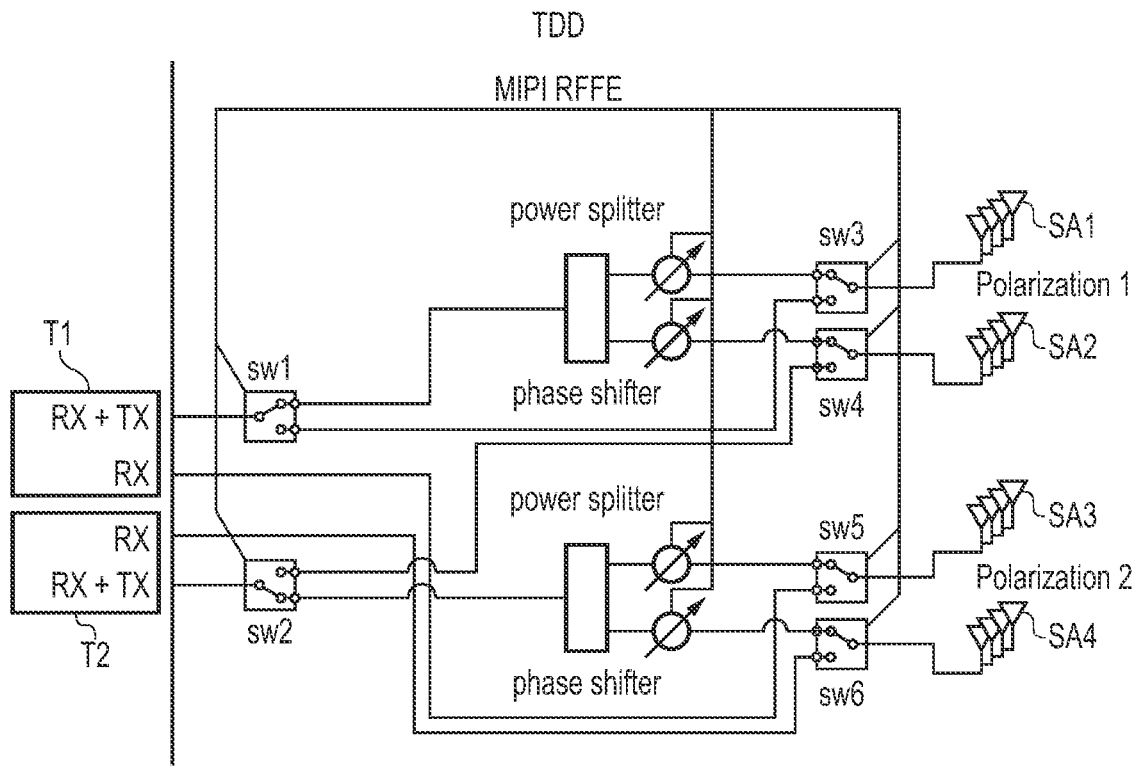
Figure 10B:
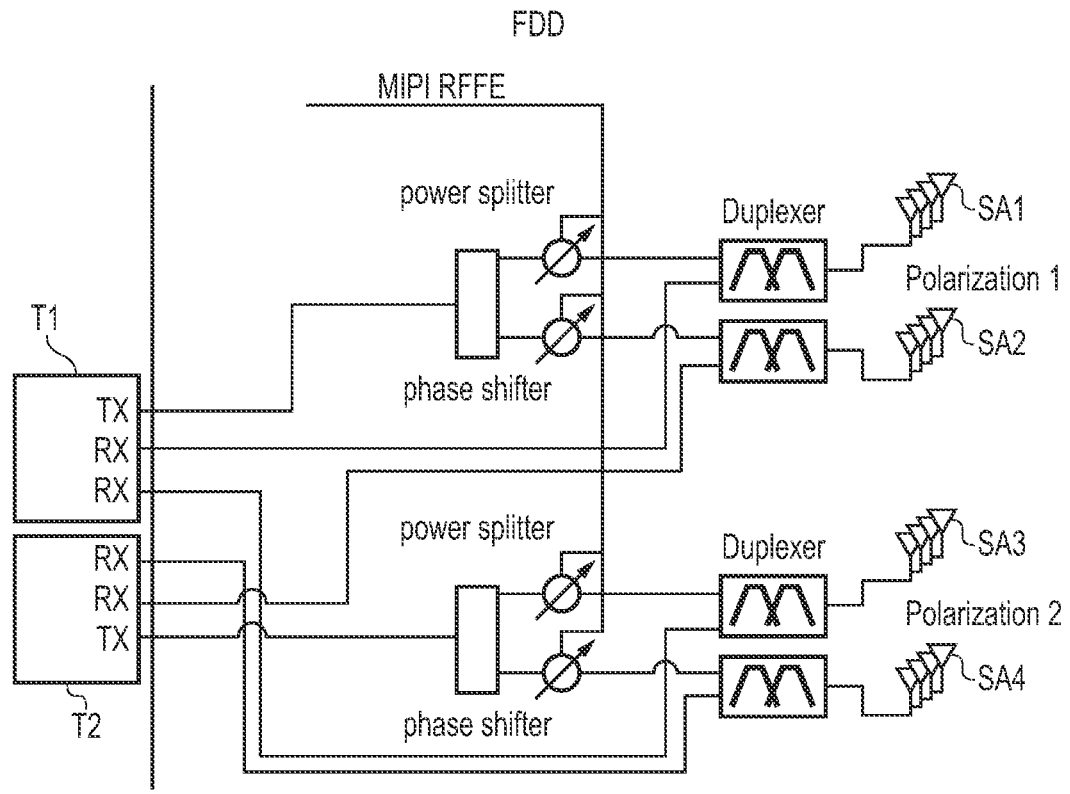

FIGS. 10A and 10B illustrate alternative RF circuits for feeding a reconfigurable antenna array network. In the arrangement of FIG. 10A, various RF switches labelled SW1-SW6, are used to make antenna array element selection in support of configuration of the antenna array to provide an antenna or antennae which can support SISO, 2×2 MIMO or 4×4 MIMO communication links as described in more detail below. The implementation shown in FIG. 10A utilises power splitters and phase shifters. The phase shifters are used for offsetting phase differences in different switchable RF paths feeding the antenna arrays. In addition, the phase shifters can be used for implementing electrical beam steering of the beam. It will be appreciated that it is possible to replace the phase shifters by fixed delay lines and thereby achieve lower RF loss but then the more dynamic electrical beam steering of a signal emanating from the elements of the antenna array cannot be achieved. The RF front end shown in FIG. 10A allows for dynamic TDD transmit and receive slot reconfiguration as a possibility. FIG. 10B corresponds to FIG. 10A, but has some components adapted to support use in an FDD communication protocol as described in more detail below. In particular, the various switches shown in FIG. 10A are replaced by diplexers/duplexers. In the FDD implementation of FIG. 10B no switches are used with respect to time, other than those which are provided and fixed to allow a transceiver (Tx+Rx) to couple through to one of the sub-arrays. The transceiver comprises a duplexer or filter to separate the transmit frequency band from the reception frequency band and to provide the typical FDD "guard band" or "duplex gap" since transmission and reception signals need to remain separate to maintain reception sensitivity at the transceiver.

The circuitry shown in FIG. 10A comprises a digital interface, labelled as MIPI RFFE (Mobile Industry Processor Interface Radio Frequency Front End), for controlling active radio frequency components. The switch states shown in FIG. 10 are set to support an antenna array operating as a single antenna array using all the antenna elements. The array can be used as a single array both in transmission and reception, and thus supports SISO. In the arrangement shown the feed connects the radio frequency signals to the elements such that they operate as a single antenna array. The switch states of FIG. 10 can be changed so that the feed is provided to the antenna array elements so that they operate as sub-arrays. Those sub-arrays can be used in both transmission and reception, and support MIMO operation, for example, 4×4 MIMO operation, in both. The implementation of FIG. 10A can allow reconfiguration between (i) a SISO/2×2 MIMO configuration of the elements and (ii) provision of sub-arrays formed from the antenna array elements so support, for example 4×4 MIMO operation. The feed circuit as shown can support reconfiguration between TDD uplink and downlink time slots.

In particular, the arrangement of FIG. 10A can be considered to comprise two transceivers, T1 and T2. As shown, each transceiver has 2 separate receiver chains and one transmitter chain. Transceiver T1=Rx1$a$+Tx1 & Rx1$b$ and Transceiver T2=Rx2$a$+Tx2 & Rx2$b$.

In the example illustrated, an array of antenna elements is provided with supporting RF circuitry which supports operation of the complete antenna array as 4 sub-arrays: SA1 to SA4.

If the RF circuitry is connected to the array elements as shown in FIG. 10A, a signal for transmission is fed via transmission circuitry TxT1 via switch sw1 to groupings of array elements SA1 & SA2 which each produce a transmission beam. A signal for transmission is also fed via transmission circuitry TxT2 via switch sw2 to groupings of array elements SA3 & SA4 which also each produce a transmission beam. Those transmission beams from groupings of antenna elements SA1 and SA2 and from SA3 and SA4 can, for example, be such that the groupings of array elements SA1 to SA4 act as a single antenna. The transmission can occur in a first time slot.

If left as shown in FIG. 10A, the RF circuitry is such that reception circuitry Rx1$a$, via sw1, receives a signal from groupings of array elements SA1 & SA2, and reception circuitry Rx2$a$, via sw2, receives a signal from groupings of array elements SA3 & SA4.

If used in support of 4×4 TDD MIMO communication protocols, and if used to support a different mode of operation in reception compared to transmission, the circuitry of FIG. 10A is adapted is such that in, for example, a reception time slot, reception circuitry Rx1*b* & Rx2*b* are coupled to their respective groupings of antenna array elements when sw5 and sw6 are moved to the other throw. Circuitry Rx1*a* then receives a signal via switches sw1 and sw3 from the grouping of antenna elements SA1, and receiver circuitry Rx2*a* then receives a signal via switches sw2 and sw4 from grouping of antenna elements SA2. For transmission of a signal (in fact, 4 transmission signals) the switches remain in the positions shown in FIG. 10*a*: in a transmission time slot, a transmission signal is fed via transmission circuit TX1 to SA1 & SA2, and via transmission circuit Tx2 to SA3 & SA4.

As suggested above, to support FDD operation, a slight adaptation of the circuitry is required as shown in FIG. 10B. When connected as shown in FIG. 10B, the circuitry is configured to feed a signal using transmission circuit Tx1 to groupings of antenna array elements SA1 & SA2. Feeding the groupings of antenna array elements with the same signal means that SA1 and SA2 work together as one antenna, with double the gain compared to operating SA1 or SA2 separately. Similarly, a transmission signal is fed via transmission circuitry Tx2 to groupings of antenna array elements SA3 & SA4. Feeding the groupings of antenna array elements with the same signal means that SA3 and SA4 work as one antenna, with double gain compared to operating SA3 or SA4 separately.

In FDD operation, simultaneously to the transmission signals, a received signal reaches reception circuitry Rx1*a* from grouping of antenna array elements SA1 and a received signal reached reception circuitry Rx2*a* from grouping of antenna array elements SA2. Reception circuitry Rx1*b* is fed a signal from grouping of antenna array elements SA3 and reception circuitry Rx2*b* is fed a signal from grouping of antenna array elements SA4. The duplexers keep the reception and transmission bands separate so they do not interfere with each other. The same transmission & reception frequencies are fed from top & bottom transceivers T1 and T2 to groupings of antenna array elements SA1 to SA4. As shown in FIG. 10B, the circuitry supports 4×4 FDD MIMO in reception and since there are only two separate transmission signals the circuitry supports 2×2 MIMO transmission.

Figure 11:
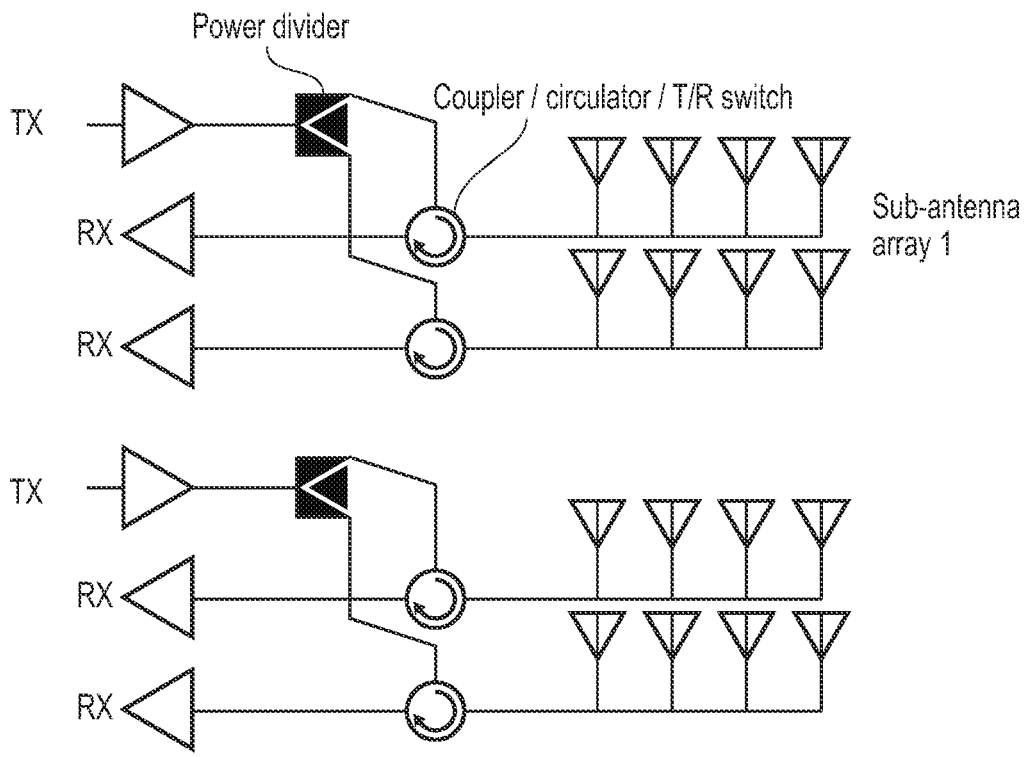

FIG. 11 illustrates a further implementation of RF circuitry which can be used in support of effective reconfiguration of an array of antenna elements. In this implementation, circulators are used within the RF circuit. In addition, transmit receive (TR) switches and RF couplers can be used to provide control signals to RF switches as shown. Constellation assumes separate transmitters and receivers (or separate transmit and receiver ports) instead of transceiver. According to the arrangement shown in FIG. 11, signals for transmission by the antenna array are split, for example, into two, and pushed to two sub-arrays of the elements of the array via a coupler/circulator/T/R switch arrangement. Received signals are connected to one coupler/circulator/T/R switch as is illustrated. In relation to reconfiguration of the array to match adjacent TDD time slots, and assuming use of T/R switches, the resulting circuit operates similarly to the circuit shown in FIG. 9. In an implementation suited to reconfiguration of the array to support an FDD communication protocol, circulators are used. Of course, to support FDD appropriately, there may be a requirement to ensure appropriate components are used, for example, wide band/multi band circulator components which can support UEs capable of using with many frequency bands scattered over 400 MHz-6 GHz spectrum range. However, the arrangement, without significant component restriction, could support single FDD bands having appropriate FDD duplex separation between the transmission and reception frequency bands.

The implementation of FIG. 11 could operate in response to detection of transmission energy. Particular benefits of the arrangement of FIG. 11 and similar arrangements are that there is no need to use control signals provided by, for example, a UE modem in relation to TDD uplink and downlink slot timing and the system for controlling the reconfigurable antenna arrangement can therefore be independent of the UE modem or transceiver.

Figure 12:
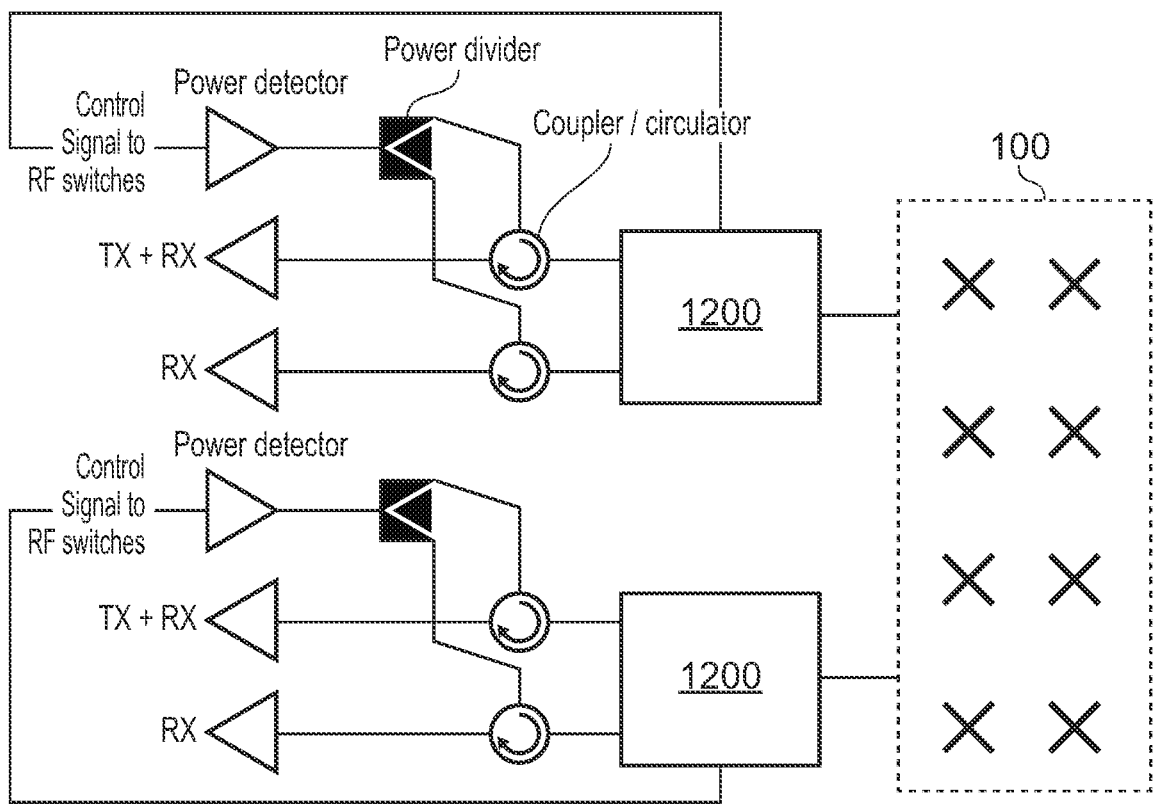

FIG. 12 illustrates a further implementation of RF circuitry which can be used in support of effective reconfiguration of an array of antenna elements. In particular, FIG. 12 shows additional circuitry which could be used in combination with the circuitry 1200 of FIG. 9. The additional circuitry comprises a coupler or circulator which is configured to sample TDD RF signals going to RF circuit and array. The sampled signal is conveyed to a power detector. The power detector is configured to detect whether the system is operating to transmit or receive and can thus determine whether the system is operating to serve a TDD transmit or receive timeslot. The power detector output can be transformed to be used as a control signal for appropriate RF switches and thereby facilitates reconfiguration of the antenna array elements to support transmission and reception regimes selected for TDD transmit and receive time slots. The additional circuitry of FIG. 12 provides a mechanism by which reconfiguration of the antenna array can be implemented independent of a need for control signals output from a UE modem or transceiver.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

As used in this application, the term "circuitry" may refer to one or more or all of the following:
  (a) hardware-only circuit implementations (such as implementations in only analog and/or digital circuitry) and
  (b) combinations of hardware circuits and software, such as (as applicable):
    (i) a combination of analog and/or digital hardware circuit(s) with software/firmware and
    (ii) any portions of hardware processor(s) with software (including digital signal processor(s)), software, and memory(ies) that work together to cause an apparatus, such as a mobile phone or server, to perform various functions) and
  (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. An apparatus, comprising:
   an antenna array comprising a plurality of antenna elements, the antenna array comprising one or more grouping of the plurality of antenna elements configured to provide:
   a first configuration in which the one or more grouping of the plurality of antenna elements supports at least transmission of a signal according to a first antenna system, wherein the first configuration comprises substantially all of the plurality of antenna elements configured for use as a single array, and wherein the first antenna system comprises a Single Input, Single Output antenna system or the first configuration comprises at least two sub arrays formed from the one or more grouping of the plurality of antenna elements such that the first antenna system comprises a Multiple Input, Multiple Output antenna system;
   a second configuration in which the one or more grouping of the plurality of antenna elements supports at least reception of a signal according to a second antenna system, wherein the second configuration comprises at least two sub arrays formed from the one or more grouping of the plurality of antenna elements, and wherein the second antenna system comprises a Multiple Input, Multiple Output antenna system having more sub arrays than the sub arrays that comprise the Multiple Input, Multiple Output antenna system of the first antenna system; and
   circuitry configured to reconfigure the antenna array from the first configuration to the second configuration during a reception time slot.

2. An apparatus according to claim 1, wherein the apparatus is configured in the first configuration in which the one or more grouping of the plurality of antenna elements supports transmission and reception of a signal and in the second configuration in which the one or more grouping of the plurality of antenna elements supports transmission and reception of a signal.

3. An apparatus according to claim 2, wherein the apparatus is configured to operate in a wireless communication network operating using Frequency Division Duplex techniques, wherein the first configuration is configured to transmit a signal from a first grouping of the plurality of antenna elements and simultaneously receive a signal from the first grouping of the plurality of antenna elements,
   and the second configuration is configured to transmit a signal from a second grouping, different than the first grouping, of the plurality of antenna elements and simultaneously receive a signal from the second grouping of the plurality of antenna elements.

4. An apparatus according to claim 1, wherein the first configuration and second configuration have coincident boresight directions.

5. An apparatus according to claim 1, wherein an antenna gain from the first configuration differs from the antenna gain from the second configuration.

6. An apparatus according to claim 1, wherein the apparatus is configured to operate in a wireless communication network, wherein the first and second configurations are configured to support transmission within the wireless communication network using a first set of one or more frequencies; and the first and second configurations are configured to support reception within the wireless communication network using a second set of one or more frequencies.

7. An apparatus according to claim 1, wherein the apparatus is configured to operate in a wireless communication network, wherein the first configuration is configured for transmission of a signal from the plurality of antenna elements and the second configuration is configured for reception of a signal at the plurality of antenna elements and wherein the transmission and reception are performed consecutively.

8. An apparatus according to claim 7, wherein the apparatus is configured to operate in a wireless communication network operating using Time Division Duplex techniques, wherein the first configuration is configured to transmit a signal from the plurality of antenna elements in a time division duplex transmission timeslot and the second configuration is configured to receive a signal at the plurality of antenna elements in a Time Division Duplex reception timeslot.

9. An apparatus according to claim 1, further comprising at least one processor and at least one memory including computer program code for one or more programs, the at least one memory and the computer program code configured to, with the at least one processor, cause the apparatus at least to:
   receive an indication of timings of transmission and reception timeslots in support of a communication link within a wireless communication network;
   configure the plurality of antenna elements to operate in accordance with the first configuration in a transmission timeslot; and
   reconfigure the plurality of antenna elements to operate in accordance with the second configuration in a reception timeslot.

10. An apparatus according to claim 1, further comprising:
    radio frequency circuitry configured to couple a signal into and out of the plurality of antenna elements via one or more input and output ports; the radio frequency circuitry being configurable to support:

a first arrangement in which a signal is couplable to one or more input ports and output ports, wherein the input and output ports are coupled to the plurality of antenna elements to allow operation of the apparatus in the first configuration; and a second arrangement in which a signal is couplable to one or more further input and output ports, wherein the further input and output ports are coupled to the plurality of antenna elements to allow operation of the apparatus in the second configuration.

11. An electronic device comprising an apparatus according to claim 1.

12. A communication apparatus, comprising the apparatus according to claim 1, wherein the communication apparatus is: a base station; a user equipment; fixed wireless access device equipment; a portable device; or a vehicle.

13. An apparatus according to claim 1, wherein the reception time slot comprises a Time Division Duplex (TDD) reception time slot.

14. An apparatus according to claim 1, wherein the Multiple Input, Multiple Output antenna system of the first configuration comprises a 2×2 Multiple Input, Multiple Output antenna system, and wherein the Multiple Input, Multiple Output antenna system of the second configuration comprises a 4×4 Multiple Input, Multiple Output antenna system.

15. A method for configuring an antenna array comprising a plurality of antenna elements, the antenna array comprising one or more grouping of antenna elements, the method comprising configuring the one or more grouping of the plurality of antenna elements to provide a first configuration which supports at least transmission of a signal according to a first antenna system, wherein the first configuration comprises substantially all of the plurality of antenna elements configured for use as a single array, and wherein the first antenna system comprises a Single Input, Single Output antenna system or the first configuration comprises at least two sub arrays formed from the one or more grouping of the plurality of antenna elements such that the first antenna system comprises a Multiple Input, Multiple Output antenna system;

configuring the one or more grouping of the plurality of antenna elements to provide a second configuration which supports at least reception of a signal according to a second antenna system, wherein the second configuration comprises at least two sub arrays formed from the one or more grouping of the plurality of antenna elements, and wherein the second antenna system comprises a Multiple Input, Multiple Output antenna system having more sub arrays than the sub arrays that comprise the Multiple Input, Multiple Output antenna system of the first antenna system; and reconfiguring the antenna array from the first configuration to the second configuration during a reception time slot.

16. A method according to claim 15, wherein configuring the one or more grouping of the plurality of antenna elements to provide the first configuration comprises providing the first configuration in which the one or more grouping of the plurality of antenna elements supports transmission and reception of a signal and configuring the one or more grouping of the plurality of antenna elements to provide the second configuration comprises providing the second configuration in which the one or more grouping of the plurality of antenna elements supports transmission and reception of a signal.

17. A method according to claim 16, wherein the antenna array is configured to operate in a wireless communication network operating using Frequency Division Duplex techniques, wherein configuring the one or more grouping of the plurality of antenna elements to provide the first configuration comprises providing the first configuration configured to transmit a signal from a first grouping of the plurality of antenna elements and simultaneously receive a signal from the first grouping of the plurality of antenna elements, and configuring the one or more grouping of the plurality of antenna elements to provide the second configuration comprises providing the second configuration to transmit a signal from a second grouping, different than the first grouping, of the plurality of antenna elements and simultaneously receive a signal from the second grouping of the plurality of antenna elements.

18. A method according to claim 15, wherein the first configuration and second configuration have coincident boresight directions.

19. A method according to claim 15, wherein the reception time slot comprises a Time Division Duplex (TDD) reception time slot.

20. A method according to claim 15, wherein the Multiple Input, Multiple Output antenna system of the first configuration comprises a 2×2 Multiple Input, Multiple Output antenna system, and wherein the Multiple Input, Multiple Output antenna system of the second configuration comprises a 4×4 Multiple Input, Multiple Output antenna system.

* * * * *